(12) United States Patent
Swift et al.

(10) Patent No.: US 7,954,861 B2
(45) Date of Patent: Jun. 7, 2011

(54) CRIMPED/SWAGED-ON TUBING TERMINATIONS AND METHODS

(75) Inventors: Jonathan C. Swift, Cambridge (GB); Todd A. Eyster, Iola, KS (US); Geoffrey R. Keast, Cambs (GB); Donald R. Gilbreath, Castle Rock, CO (US)

(73) Assignee: The Gates Corporation, Denver, CO (US)

( * ) Notice: Subject to any disclaimer, the term of this patent is extended or adjusted under 35 U.S.C. 154(b) by 983 days.

(21) Appl. No.: 11/710,369

(22) Filed: Feb. 23, 2007

(65) Prior Publication Data

US 2008/0201927 A1 Aug. 28, 2008

(51) Int. Cl.
*F16L 13/14* (2006.01)
(52) U.S. Cl. .......... 285/382.2; 285/382; 29/507; 29/523
(58) Field of Classification Search ................. 285/382, 285/382.1, 382.2, 382.4; 29/507, 523
See application file for complete search history.

(56) References Cited

U.S. PATENT DOCUMENTS

| | | | | |
|---|---|---|---|---|
| 232,259 | A * | 9/1880 | Graham | 285/222 |
| 1,794,849 | A * | 3/1931 | Hagstedt | 285/149.1 |
| 2,086,151 | A * | 7/1937 | Bannerman | 285/55 |
| 2,599,389 | A * | 6/1952 | Hume | 285/93 |
| 4,328,982 | A * | 5/1982 | Christianson | 285/351 |
| 4,575,913 | A * | 3/1986 | Sugiuchi et al. | 29/432 |
| 5,069,058 | A | 12/1991 | Hyatt | 72/413 |
| 5,080,406 | A * | 1/1992 | Hyatt et al. | 285/330 |
| 5,590,914 | A * | 1/1997 | Platner et al. | 285/23 |
| 6,131,964 | A * | 10/2000 | Sareshwala | 285/382 |
| 6,409,175 | B1 * | 6/2002 | Evans et al. | 277/314 |
| 6,619,701 | B1 * | 9/2003 | Udhofer | 285/382.2 |
| 6,692,040 | B1 * | 2/2004 | McKay et al. | 285/382 |
| 2006/0186666 | A1 * | 8/2006 | McKay | 285/382 |

FOREIGN PATENT DOCUMENTS

| | | |
|---|---|---|
| FR | 2 376 985 | 8/1978 |
| GB | 2 058 982 A | 4/1981 |
| WO | WO 2006/103432 A1 | 5/2006 |

OTHER PUBLICATIONS

Invitation to Pay Additional Fees and, Where Applicable, Protest Fee—Communication Relating to the Results of the Partial International Search, Date of Mailing Aug. 1, 2008.
Notification of Transmittal of the International Search Report and the Written Opinion of the International Searching Authority, or the Declaration. Date of Mailing Oct. 8, 2008.

* cited by examiner

*Primary Examiner* — James M Hewitt
(74) *Attorney, Agent, or Firm* — T. A. Dougherty, Esq.; J. A. Thurnau, Esq.; P. N. Dunlap, Esq.

(57) ABSTRACT

A tubing termination comprises a termination portion adapted to make a fluid connection and a tube attachment portion, adapted to receive a tube and to be crimped or swaged. The tube attachment portion comprises a retention mechanism that is adapted to be manipulated during crimping or swaging to bite the tube so as to lock the tube attachment portion relative to the tube. This retention mechanism may take the form of a deformable bite ring, a deflectable c-insert, irregularities defined on an inner surface of the tube attachment portion, and/or the like. The tube attachment portion also may include a resilient sealing mechanism adapted to provide a seal between the tube and the tube attachment portion, and thereby a fluid-tight connection between the tube and the termination portion.

11 Claims, 4 Drawing Sheets

CRIMPED/SWAGED-ON TUBING TERMINATIONS AND METHODS

BACKGROUND OF THE INVENTION

1. Field of the Invention

This invention relates generally to tubing terminations and more particularly to coupling employing crimped-on or swaged-on tubing terminations.

2. Description of the Prior Art

Many hose terminations, such as port fittings or stems, are currently brazed, soldered or welded onto tubing to provide a means for permanently attaching the tubing to hoses or ports. These are expensive processes that may require significant investment in capital equipment, significant energy costs, relatively tight tolerances for the tubing and fittings, skilled personnel, and post-finishing operations. Thus, these operations often cannot be utilized at a hose assembly fabricator near the customer and have inherent variability, the quality of which may be difficult to evaluate pre failure. These factors combine to allow for unacceptable defect level in stems and terminations brazed, soldered or welded onto tubing, resulting in elevated costs and downtime.

Other methods are known for joining fittings to a tube or joining two tubes. As one example of joining two tubes, Hyatt, U.S. Pat. No. 5,069,058 discloses a swaging tool is provided for swaging a fitting and joining two tubes together. The tool of Hyatt compresses, or swages, a special fitting so that the fitting is given an irregular configuration along its inner wall and correspondingly swages the tube to match the inner wall. Problematically, this deformation of the tube might result in significant deformation of the inner wall of the tube in such a manner as to disrupt or perturb fluid flow through the tube. Further, such a swaging arrangement is not particularly well suited, for attaching a tubing termination, such as a port or a stem, to a tube. Such a swaging process may also be time consuming and require costly components, as such it is not necessarily suited to high volume manufacturing.

SUMMARY

The present invention is directed to systems and methods which provide crimped or swaged tubing attachments. The present invention provides a tube to fitting interface that will allow for repeatable, reliable, leak free connection that is efficient to manufacture. The resultant tube-to-fitting connections are resistant to high pressure forces often encountered in tubular assemblies.

Embodiments of the present invention utilize a male and female portion where the female portion is mechanically deformed to retain the male portion. Such deformation is preferably provided by external crimping or swaging. Although crimping and swaging are two different processes for joining ends of hoses or tubes with fittings or other hoses or tubes, both employ compressing a collar or the like and will be referred to herein interchangeably. Also, internal swaging may be used in accordance with the present invention to provide the aforementioned deformation through expansion of a tube end. A seal arrangement, such as an O-ring and back ring, or an O-ring, or a ductile or resilient seal alone, may be used to provide sealing between the male and the female fitting portions. Embodiments of the present coupling may call for one or both of the male and the female components to be formed in the tube or either component can be machined. For example, the male portion of the fitting may be a tube end of the like. Furthermore, in accordance with various embodiments of the present invention the seal may be mounted either on the male or female portion of the fitting.

Embodiments of a tubing termination in accordance with the present invention comprises a termination portion, such as a port fitting or stem adapted to make a fluid connection, and a tube attachment portion, adapted to receive a tube and to be crimped or swaged. The tube attachment portion preferably includes a retention mechanism and a resilient sealing mechanism.

Embodiments of a retention mechanism are adapted to be manipulated during crimping or swaging to bite the tube in such a manner as to lock the tube attachment portion relative to the tube. This locking of the tube attachment portion relative to the tube preferably includes both rotationally locking and longitudinally locking the tube attachment portion relative to the tube. The retention mechanism may be adapted to be deformed or deflected to bite the tube so as to rotationally and longitudinally lock the tube attachment portion relative to the tube.

The retention mechanism in embodiments of the present tubing termination might take the form of irregularities defined in an inner surface of the tube attachment portion. These irregularities may be adapted to engage an outer surface of the tube upon crimping of the tube attachment portion to rotationally and/or longitudinally lock the tube attachment portion with the tube. Such irregularities may be knurling, nubs and/or serrations defined in an inner surface of the tube attachment portion or on the external surface of the tubing. In accordance with various embodiments of the present invention, such nubs rotationally lock the tube relative to the tube attachment portion, while serrations longitudinally lock the tube relative to the tube attachment portion.

A retention mechanism that is adapted to be deformed, may take the form of a bite ring. Such a bite ring may be deformed by crimping at least a portion of the attachment portion. Such a bite ring may be serrated and/or an exterior surface of the bite ring may be knurled to frictionally engage an inner surface of the attachment portion. Non-serrated bite rings may have an interior surface that is knurled to frictionally engage an outer surface of the tube and an exterior surface of such an internally knurled bite ring might also be knurled.

As noted, the retention mechanism may be adapted to rotationally deflect during crimping of at least a portion of the tube attachment portion to bite into the tube and lock the tube attachment portion relative to the tube, preferably rotationally, torsionally and longitudinally. In such an embodiment the retention mechanism may also adapted to radially deflect in such a manner as to bite the tube attachment portion in addition to the tube to lock the tube attachment portion relative to the tube. Such a retention mechanism may take the form of a c-insert, or the like, adapted to be deflected through crimping of at least a portion of the attachment portion. Ends of such a c-insert may be adapted to bite into the tube attachment portion to aid in locking the tube attachment portion relative to the tube. These embodiments of the present invention may utilize a c-insert bite sleeve and an elastomer or other resilient seal. The c-insert and its mating groove may be shaped to increase the biting force on the tubing as pressure increases.

Embodiments of a resilient sealing mechanism are preferably adapted to provide a seal between the tube and the tube attachment portion and thereby a fluid-tight connection between the tube and the termination portion. The resilient sealing mechanism may be a seal, such as an o-ring, or the like, disposed independent from the bite ring. This seal may be a single seal or a "seal pack," such as an o-ring and backing ring, a ductile seal, or some other resilient seal. Regardless, the seal may be disposed on either "side" of the bite ring or the irregularities defined in an inner surface of the tube attachment portion. Alternatively, a bite ring may be overmolded with a resilient sealing material to provide at least a part of the resilient sealing mechanism. As a further alternative, the sealing mechanism may be molded into the crimping socket.

In operation, to create a connection, a tube is placed into the crimp connect female assembly and pushed up to a tube stop. The female portion is then mechanically deformed to retain the male portion. A soft seal arrangement, which might include an overmolded seal, provides a seal between the male and the female components. Alternative embodiments may employ a "standard" seal, i.e. O-ring, or the like, rather than an overmolded seal. Mechanical locking of the male portion relative to the female portion may be provided by the above discussed irregularities, bite ring or c-insert, biting the tube. Crimping deforms the socket around the locking ring, closing recesses to trap the ring within the socket. For example, the material making up a circumferential peripheral raised shoulder on the outside portion of the tube attachment portion may be compressed into a recess defined by the locking ring or around the locking ring. Further, the fitting-to-tube interface may have a cone shaped section that upon crimping loads the two pieces together to form a force-fit, such that when pressure is applied the tube form tightens further into the female.

Thus, an embodiment of a method for providing a termination on a tube end in accordance with the present invention comprises inserting the tube end into a tube attachment portion of a tubing termination, such as described above. Preferably, the tubing termination also comprises a termination portion adapted to make a fluid connection, as also described above. At least a portion of the tube attachment portion is crimped to manipulate a retention mechanism associated with the tube receptive portion to bite the tube so as to lock the tube attachment portion relative to the tube and to seal between the tube and the tube attachment portion to provide a fluid-tight connection between the tube and the termination portion.

Advantageously, the above embodiments require little or no component or equipment capital investment. Rather, the present systems and methods employ commonplace existing crimping equipment and relatively inexpensive components.

As a further advantage, no heat is employed to practice the present invention. Therefore, typical safety concerns associated with welding and brazing are avoided and weakening of tubing or degradation of tube by annealing, such as may occur during welding or brazing operations, is avoided. Further, the present systems and methods provide a fitting seal without affecting any plating present on the tube.

Advantageously, embodiments of the present systems and methods provide a quick and straightforward mechanism for providing a fitting-to-tube seal and given the hardness differential between collars used in conjunction with embodiments of the present invention and typical tubing material, good "bite" is provided, promoting retention.

Preferably, the present invention utilizes a soft seal, malleable seal or resilient seal that is not torque dependent. The proper seal compression is generated by the interaction of geometries of the outside diameter of the male, the seal's cross section, and the inside diameter of the female portion of the fitting.

Advantageously, upon mechanical deformation of the female portion, the resulting metal to metal interface resists rotation, axial loading, and moment loads.

As a further advantage, the present invention makes use of an annular sealing arrangement instead of mechanical means, such as a weld, solder or braze. Further the present invention provides a separation of functionality between resistance to outside loading and sealing of the interior fluid path.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
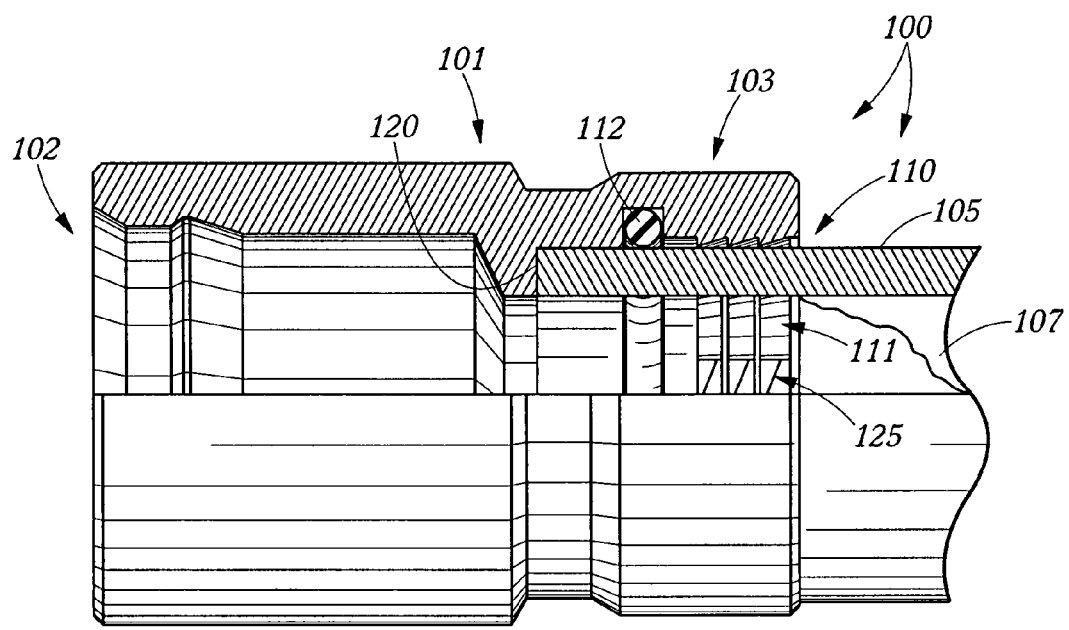
FIG. 1 is a partially fragmented, generally quarter-sectioned side view of an embodiment of an uncrimped coupling employing irregularities, in the form of serrations or teeth, defined in an inner surface of the tube attachment portion in accordance with the present invention.

An embodiment of coupling 100 employing tubing termination 101 of the present invention is shown in FIG. 1. Illustrated tubing termination 101 includes termination portion 102 adapted to make a fluid connection, such as the illustrated port fitting, a stem or a threaded fitting. Illustrated tubing termination 101 also includes tube attachment portion 103, adapted to receive tube 105 and to be crimped or swaged. Tube 105 is shown throughout the drawings in greater fragmentation than tubing termination 101. Preferably, tube attachment portion 103 includes and/or houses retention mechanism 110, shown in FIG. 1 as irregularities, in the form of serrations or teeth, defined by an interior surface 11 of tube attachment portion 103. Preferably, retention mechanism 110 is adapted to be manipulated during crimping or swaging to bite tube 105 so as to lock tube attachment portion 103 relative to tube 105, without significantly deforming inner bore 107 of tube 105. Tube attachment portion 103 may, in accordance with various embodiments of the present invention, be locked relative to tube 105, rotationally and/or longitudinally. A resilient sealing mechanism, such as illustrated o-ring 112, is preferably adapted to provide a seal between tube 105 and tube attachment portion 103 and thereby provide a fluid-tight connection between tube 105 and termination portion 101. The sealing mechanism may be deployed on either side of retention mechanism 110.

The retention mechanism of the present invention may take one of several different forms. For example, in FIGS. 1 through 3 the retention mechanism is defined in an inner surface of tube attachment portions 103, 203, and 303. In particular, in FIG. 1 the illustrated retention mechanism of tubing termination embodiment 101 comprises the aforementioned serrations or teeth, defined on an inner surface of tube attachment portion 103. Such serrations or teeth are particularly well adapted to longitudinally secure tube 105 relative to tube attachment portion 103.

Alternatively, the serrations shown in FIG. 1, defined on the interior surface of tube attachment retaining portion 103 may be threads, such threads may facilitate attaching termination 101 onto tube 105, or conversely, deploying tube 105 in termination 101, by screwing termination 101 onto tube 105, or tube 105 into termination 101. To further facilitate deployment, the exterior of the end of tube 105 may also be threaded. In such embodiments, sealing mechanism 112 may be deployed outside of the threads (on the opposite side of the threads as illustrated in FIG. 1) to provide an undisturbed tubing surface for the seal to seal against. In such threaded embodiments the tube retention portion is still crimped or swaged, in accordance with the present invention, following deployment of the tube in the tube retention portion, to lock the tube relative to the tube retention portion and to compress the seal into engagement with the outer surface of the tube.

Figure 2:
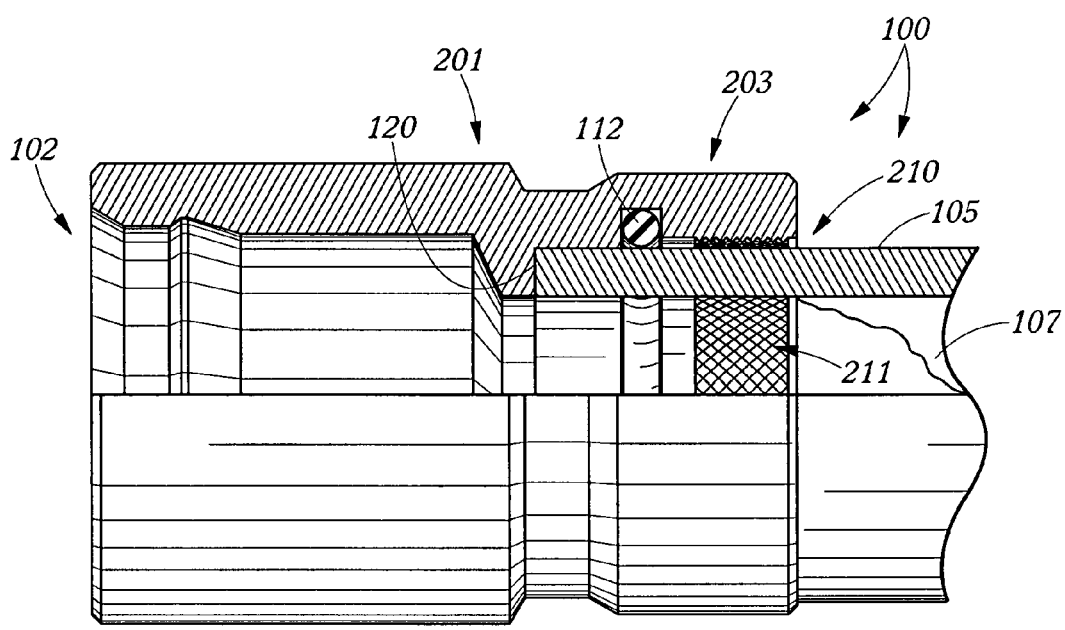
FIG. 2 is a partially fragmented, generally quarter-sectioned side view of an embodiment of an uncrimped coupling employing irregularities, in the form of knurling, defined in an inner surface of the tube attachment portion in accordance with the present invention.
Figure 3:
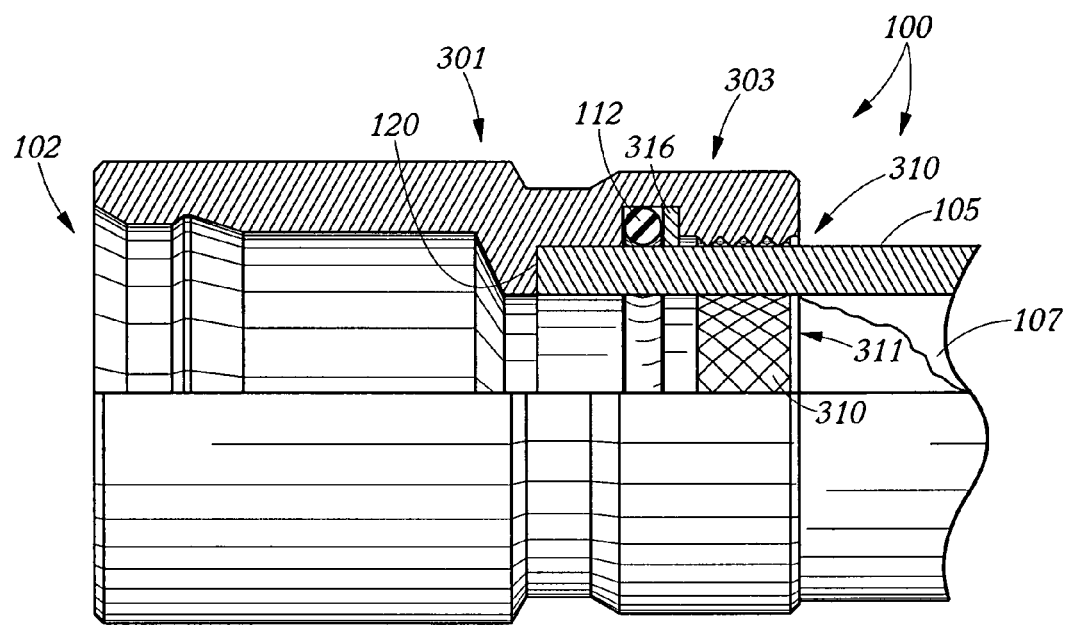
FIG. 3 is a partially fragmented, generally quarter-sectioned side view of an embodiment of an uncrimped coupling employing irregularities, in the form of nubs, defined in an inner surface of the tube attachment portion, in accordance with the present invention.

Tubing termination embodiment 201, illustrated in FIG. 2, includes knurling 210 defined on interior surface 211 of tube attachment portion 203. In FIG. 3, the retention mechanism of tubing termination embodiment 301 comprises nubs 310 defined by inner surface 311. Such nubs may be formed in a number of manners, such as by deeply, coarsely knurling inner surface 311 of tube attachment portion 303. Nubs 310 are particularly well adapted to rotationally secure tube 105 relative to tube attachment portion 303.

Figure 4:
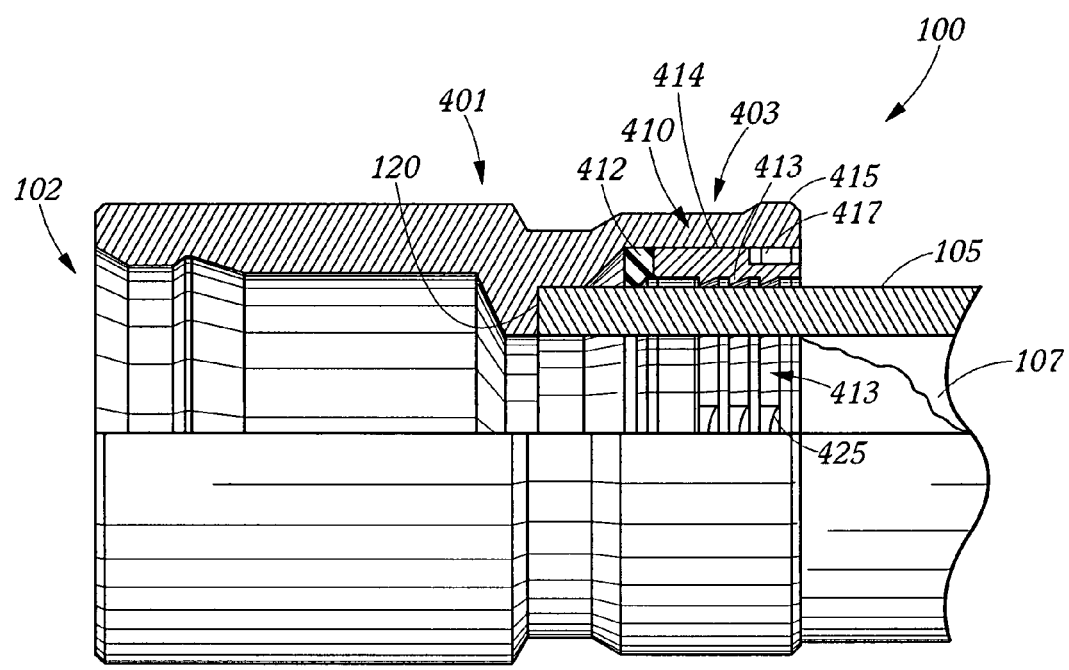
FIG. 4 is a partially fragmented, generally quarter-sectioned side view of an embodiment of an uncrimped coupling employing a bite ring in accordance with the present invention.
Figure 5:
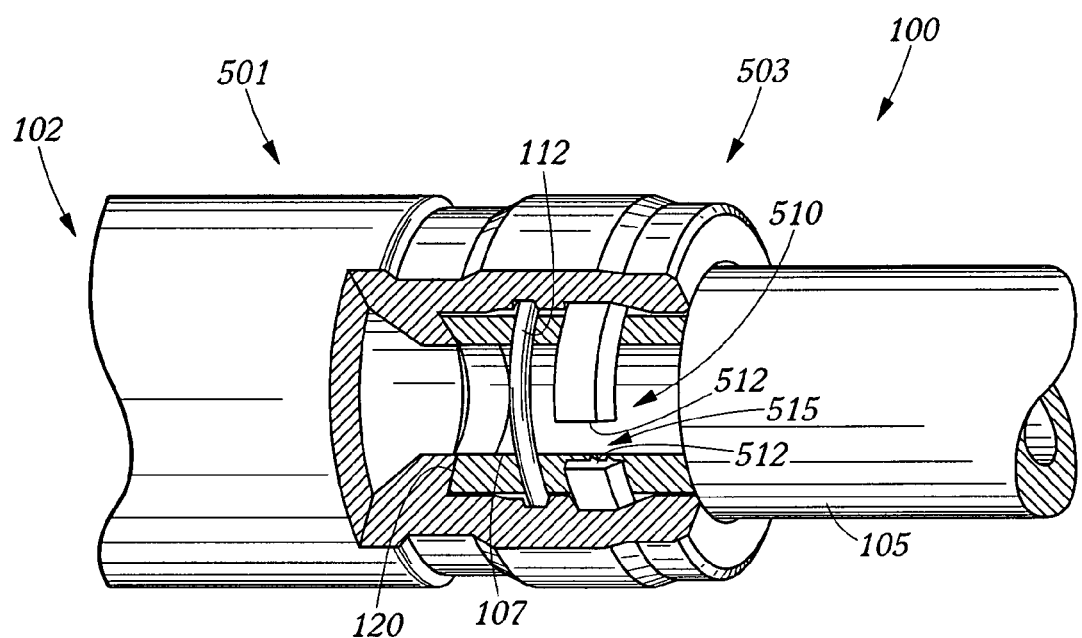
FIG. 5 is a partially fragmented, generally quarter-sectioned perspective view of an embodiment of a crimped coupling employing a c-insert in accordance with the present invention.
Figure 6:
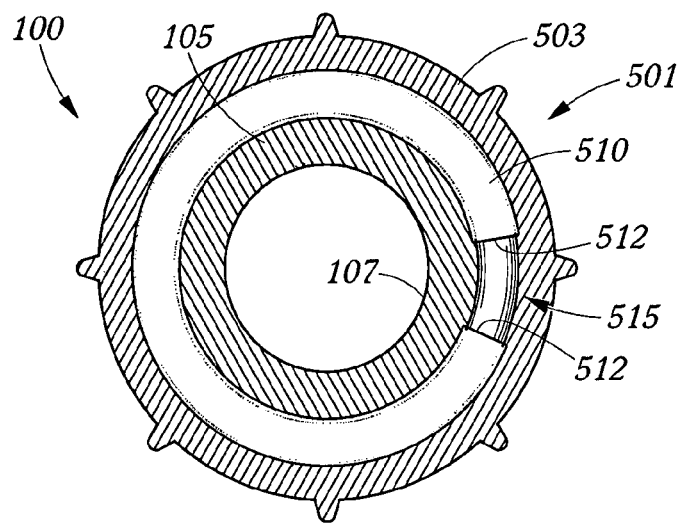
FIG. 6 is a fragmented end view of a version of the embodiment of FIG. 5 showing, in an exaggerated manner, keying of a tube with a crimped tube attachment portion using a c-insert in accordance with the present invention.

Other embodiments may employ separate retaining mechanisms. In FIG. 4, the retention mechanism of tubing termination embodiment 401 is illustrated as bite ring 410, while in FIG. 5 the illustrated retention mechanism of tubing termination embodiment 501 is deflectable c-insert 510. A retention mechanism such as bite ring 410 of FIG. 4 may be adapted to be deformed to bite tube 105 so as to rotationally and/or longitudinally lock attachment portion 403 relative to tube 105 upon crimping of at least a part of tube attachment portion 403, as shown in FIG. 4, without significantly deforming inner bore 107 of tube 105. Alternatively, c-insert 510 of FIG. 5 might be adapted to radially deflect upon crimping of tube attachment portion 503 to bite into tube 105, as shown in FIGS. 5 and 6 to lock tube attachment portion 503 relative to tube 105 without significantly deforming inner bore 107 of tube 105. In particular, as shown in FIG. 6, c-insert retention mechanism 510 may also be adapted to radially deflect to bite outwardly into tube attachment portion 503, so as to lock tube attachment portion 503 relative to tube 105. This latter deflection may be provided by ends 512 of c-insert 510 deflecting in such a manner as to pinch tube attachment portion 503 (as well as tube 105) or to deflect outward to bite tube attachment portion 503. As shown in FIG. 6, when tube attachment portion 503 is crimped c-insert 510 will be compressed radially and gap 515 in c-insert 510 reduced. However, preferably, gap 515 will not close completely. Preferably, once crimping is complete, c-insert 510 will be deflected a substantial amount and in such a manner that ends 512 bite into both tube 105 and tube attachment portion 503, keying tube attachment portion 503 with tube 105 to provide torque resistance in accordance with various embodiments of the present invention.

To further enhance the bite of a bite ring the bite ring may be serrated, such as bite ring 410 shown in FIG. 4. Serrations 413 bite into tube 105 upon crimping of tube attachment portion 403, without significantly deforming inner bore 107 of tube 105. Preferably, back 414 of bite ring would bite into an interior surface of tube attachment portion 403. Thusly, tube 105 is locked, relative to tube attachment portion 403, preferably in both a longitudinal and rotational manner. Whether the interior of a bite ring is serrated or not, exterior 414 of the bite ring may be knurled to facilitate back 414 of bite ring 410 biting into an interior surface of tube attachment portion 403. When a tube attachment portion housing such an exteriorly knurled bite ring is crimped, the bite between the bite ring and the interior surface of the tube attachment portion is enhanced through frictional engagement, thereby enhancing the rotational, and/or longitudinal locking of tube 105 relative to tube attachment portion 403. Knurling may be used in place of serrations 413 to provide enhanced frictional engagement between the bite ring and tube, and thereby between tube 105 and tube attachment portion 403, without significantly deforming inner bore 107 of tube 105.

Crimping deforms the socket defined by tube attachment portion around bite ring 410, such that any recesses are closed, trapping the ring within the socket. For example, circumferential peripheral raised shoulder 415 on the outside portion of tube attachment portion 403 may be compressed into recess 417, which may be defined by bite ring 410, as illustrated in FIG. 4, or merely defined around the bite ring. Additionally or alternatively, the tube attachment portion might define a fitting-to-tube interface that has a cone shaped section, or the like, that loads the tube and bite ring such that following crimping the tube and bite ring form a force-fit, such that when pressure is applied to withdraw the tube, the tube tightens further into the bite ring and thus into the tube retaining portion of the fitting.

As mentioned above resilient sealing mechanism 112 is preferably adapted to provide a seal between tube 105 and tube attachment portion 103 and thereby provide a fluid-tight connection between tube 105 and termination portion 101. As also indicated above, resilient sealing mechanism 112 may be a separate seal, such as o-ring 112 or other resilient or malleable seal disposed independent from bite ring 410, c-insert 510, or other retention mechanism. Such a seal may also incorporate a backing ring, or the like, to enhance the seal provided by an o-ring or other seal. Such a seal and backing ring configuration may be referred to as a seal pack and may include additional seals, backing rings, and/or the like. In accordance with various other embodiments of the present invention, the resilient sealing mechanism may also be incorporated into the retention mechanism. For example, in the illustrated embodiment of FIG. 4 bite ring 410 is overmolded with a resilient sealing material 412 to provide a resilient sealing mechanism in accordance with the present invention. Such an overmolded bite ring might also be deployed in conjunction with an o-ring, seal pack, or the like to further enhance sealing. Although in each of the illustrated embodiments the sealing mechanism is shown as disposed within the tube attachment portion, relative to the retention mechanism, the present invention can employ a sealing mechanism in which the seal (o-ring 112, overmold 412 and/or other elements of a seal pack, resilient seal or malleable seal) is disposed "outside" from the retention mechanism, but still within the bore of tube attachment portion 103.

As mentioned above, resilient sealing mechanism 112 is preferably adapted to provide a seal between tube 105 and the tube attachment portion, thereby providing a fluid-tight connection between tube 105 and termination 101. In certain alternative embodiments of the present invention a seal backing, which may take the form of a washer 316 or the like, such as shown in FIG. 3, may be disposed in such a manner as to provide a back shoulder to retain o-ring 112, or other resilient or malleable seal. Also, such a washer may act as a forward wall, which bite ring 410, c-insert 510, or a similar retention mechanism may reside against. Upon crimping or swaging the washer is compressed between tube 105 and the inside diameter of the tube attachment portion so as to close any potential seal extrusion gap that may exist between the tube, and the tube attachment portion. Furthermore, prior to deployment, the washer may be retained by bite ring 410 or c-insert clip 510, which may in turn be held in place by a lip defined by the tube attachment portion of termination 101.

In operation, a tubing termination may be provided for a tube end by inserting the tube end into tube attachment portion 103 of a tubing termination, such as described above, until it abuts tube stop 120 and crimping at least a portion of tube attachment portion 103 to manipulate the retention mechanism (110, 210, 310, 410 or 510) associated with tube attachment portion 103, to bite into, or otherwise engage, an exterior surface of tube 105. As a result, tube attachment portion 103 and tube 105 are rotationally, and/or longitudinally, locked, without significantly deforming interior bore 107 of tube 105. Also, a seal between tube 105 and tube attachment portion 103 results, providing a fluid-tight connection between tube 105 and termination portion 101.

Figure 7:
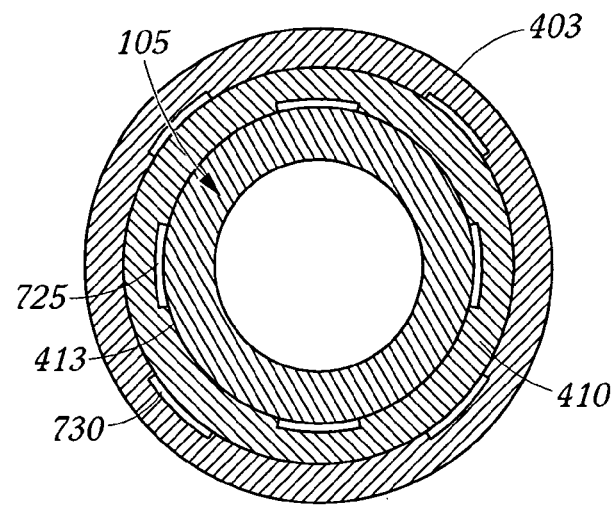
FIG. 7 is a fragmented end view of an embodiment of an uncrimped tube attachment portion showing broached recesses disrupting teeth of a bite ring.
Figure 8:
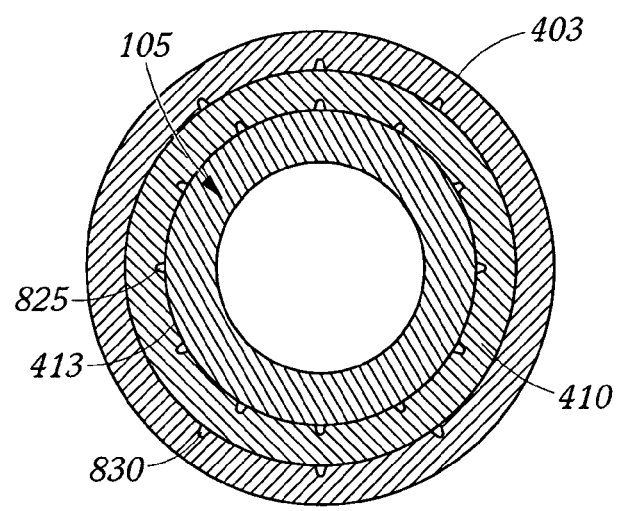
FIG. 8 is a fragmented end view of another embodiment of an uncrimped tube attachment portion showing splined grooves disrupting teeth of a bite ring.

The aforementioned torque resistance or rotational/radial locking of the termination relative to the tube may be provided in accordance with the present invention in a number of ways. One of these might be referred to as "tooth disruption". For example, serration teeth 413 of bite ring 410, serrations 110, or other retention mechanism elements, may be disrupted radially, such that upon crimping, resistance to torque is enhanced. In accordance with at least one of these embodiments serration teeth may be disrupted by broaching such as depicted in the fragmented tube attachment portion end view of FIG. 7. In particular, FIG. 7 shows broached recesses 725 (125 in FIG. 1, and 425 in FIG. 4) disrupting teeth 413 of a bite ring 410. Similarly, FIG. 7 also shows tube attachment portion broaches 730, which may also be employed to aid in providing rotational resistance following crimping. Also, in accordance with one or more others of these embodiments the teeth of the bite ring may be disrupted by splining such as illustrated in FIG. 8, also a fragmented end view of a tube attachment portion of an embodiment of the present invention. In particular, FIG. 8 shows splined grooves 825 disrupting teeth 413 of a bite ring 410. FIG. 8 also shows splined grooves 830 disrupting an inner surface of tube attachment portion 403, which may also aid in providing rotational resistance following crimping. In such broached or splined embodiments, once the tube attachment portion is crimped onto the tube, sections of more, and less, tube surface deformation result, enhancing rotational locking of the tube and tube retention portion.

Another manner of providing torque resistance might be implemented through the number of crimper dies employed to crimp the tube attachment portion. In accordance with the present invention, crimping flattens sections of the tube attachment portion. Use of a particular number of crimping dies will preferably create torque resistance by deforming more metal in some places than in others. For example, variation in the outside diameter due to the flattening of portions of the circumference of the tube attachment portion may translate to flattening of portions of the bite ring and the tube. This flattening may create sheer areas at the resulting "corners" of the resultantly deformed bite ring and tube interface.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A tubing termination comprising:
   a termination portion adapted to make a fluid connection; and
   a tube attachment portion, adapted to receive a tube and to be crimped or swaged, said tube attachment portion comprising:
      a retention mechanism that is adapted to be manipulated during crimping or swaging to bite said tube so as to lock said tube attachment portion relative to said tube;
      a resilient sealing mechanism adapted to provide a seal between said tube and said tube attachment portion and thereby a fluid-tight connection between said tube and said termination portion; and
      a washer disposed between said retention mechanism and said sealing mechanism, said washer adapted to close seal extrusion gaps between said tube and said tube attachment portion upon crimping or swaging of said tube attachment portion;
      wherein said retention mechanism comprises irregularities defined in an inner surface of said tube attachment portion, said irregularities adapted to engage an outer surface of said tube upon crimping or swaging of said tube attachment portion to lock said tube attachment portion relative to said tube;

wherein broaches in said irregularities rotationally lock said tube relative to said tube attachment portion.

2. The tubing termination of claim 1, wherein locking said tube attachment portion relative to said tube includes rotationally locking and longitudinally locking said tube attachment portion relative to said tube.

3. The tubing termination of claim 1 wherein said irregularities comprise serrations.

4. The tubing termination of claim 3 wherein said serrations longitudinally lock said tube relative to said tube attachment portion.

5. The tubing termination of claim 3, wherein said serrations comprise threads.

6. The tubing termination of claim 5, wherein said tube is threaded to threadably mate with said threads defined in an inner surface of said tube attachment portion for initial deployment of said termination on said tube, prior to crimping or swaging.

7. The tubing termination of claim 1 wherein said irregularities comprise knurling.

8. The tubing termination of claim 1 wherein said irregularities comprise nubs.

9. The tubing termination of claim 8 wherein said nubs rotationally lock said tube relative to said tube attachment portion.

10. The tubing termination of claim 1 wherein said sealing mechanism is disposed between said termination portion and said retention mechanism.

11. The tubing termination of claim 1 wherein said retention mechanism is disposed between said termination portion and said sealing mechanism.

* * * * *